(12) United States Patent
Morita

(10) Patent No.: US 9,096,138 B2
(45) Date of Patent: Aug. 4, 2015

(54) CONTACTLESS POWER FEEDING APPARATUS AND CONTACTLESS POWER FEEDING METHOD

(75) Inventor: Kazunori Morita, Mishima (JP)

(73) Assignee: MEIDENSHA CORPORATION, Tokyo (JP)

(*) Notice: Subject to any disclaimer, the term of this patent is extended or adjusted under 35 U.S.C. 154(b) by 188 days.

(21) Appl. No.: 13/981,519

(22) PCT Filed: Jan. 25, 2012

(86) PCT No.: PCT/JP2012/051534
§ 371 (c)(1),
(2), (4) Date: Jul. 24, 2013

(87) PCT Pub. No.: WO2012/102302
PCT Pub. Date: Aug. 2, 2012

(65) Prior Publication Data
US 2013/0335017 A1    Dec. 19, 2013

(30) Foreign Application Priority Data

Jan. 25, 2011  (JP) ................................. 2011-013067

(51) Int. Cl.
*H02J 7/00* (2006.01)
*H01F 21/02* (2006.01)
(Continued)

(52) U.S. Cl.
CPC ........... *B60L 11/1811* (2013.01); *B60L 11/182* (2013.01); *H02J 5/005* (2013.01);
(Continued)

(58) Field of Classification Search
CPC ............. H02J 7/00; H02J 7/025; H02J 5/005; B60L 11/1811; B60L 11/182; Y02T 10/7005; Y02T 90/16; Y02T 90/14; Y02T 90/122; Y02B 60/50
USPC ............... 320/108, 104, 109, 139; 336/69, 40
See application file for complete search history.

(56) References Cited

U.S. PATENT DOCUMENTS 8,008,888 B2     8/2011 Oyobe et al.
8,310,108 B2 *  11/2012 Inoue et al. .................... 307/104
(Continued)

FOREIGN PATENT DOCUMENTS

EP     2196351 A1 *   6/2010   ................ B60L 5/00
JP     2009106136 A *  5/2009   .............. H02J 17/00
(Continued)

OTHER PUBLICATIONS

European extended Search Report, Oct. 21, 2014, 5 pages.
(Continued)

*Primary Examiner* — Phallaka Kik
(74) *Attorney, Agent, or Firm* — Foley & Lardner LLP

(57) ABSTRACT

To make a high efficiency electric power feeding possible without a wireless communication.

There is provided an electric power feeding apparatus 100 for feeding a secondary coil 210 of a moving body 200 with an electric power, which comprises a primary coil 140 that is magnetically coupled with the primary coil with the work of resonance of a magnetic field and constructed to supply a high frequency electric power to the secondary coil 210, a high frequency electric power driver 120 that converts, by causing a magnetic field to resonate, the electric power from an alternating-current power supply 110 to a high frequency electric power that can transfer to the moving body 200 and feeds the primary coil 140 with the converted electric power, a calculation device 130 that estimates, from supplying current and voltage of the high frequency electric power driver 120, equivalent circuit parameters of an electric power transfer from the primary coil 140 to the secondary coil 210 upon resonance of the magnetic field, and a control device 150 that estimates, from the equivalent circuit parameters estimated by the calculation device 130, the receiving electric power of the secondary coil 210 and controls the high frequency electric power driver 120 in such a manner as to cause the estimated receiving electric power to show the maximum value.

6 Claims, 3 Drawing Sheets

(51) Int. Cl.
*H01F 29/00* (2006.01)
*B60L 11/18* (2006.01)
*H02J 7/02* (2006.01)
*H02J 5/00* (2006.01)

(52) U.S. Cl.
CPC ............... *H02J 7/025* (2013.01); *H01F 21/02* (2013.01); *H01F 29/00* (2013.01); *Y02B 60/50* (2013.01); *Y02T 10/7005* (2013.01); *Y02T 90/122* (2013.01); *Y02T 90/14* (2013.01); *Y02T 90/16* (2013.01)

(56) References Cited

U.S. PATENT DOCUMENTS

| | | | |
|---|---|---|---|
| 2010/0225271 A1* | 9/2010 | Oyobe et al. | 320/108 |
| 2010/0244577 A1 | 9/2010 | Shimokawa | |
| 2011/0018359 A1* | 1/2011 | Wada et al. | 307/104 |
| 2011/0049978 A1* | 3/2011 | Sasaki et al. | 307/9.1 |
| 2011/0077812 A1* | 3/2011 | Ichikawa et al. | 701/22 |
| 2011/0121778 A1 | 5/2011 | Oyobe et al. | |
| 2011/0316348 A1 | 12/2011 | Kai et al. | |
| 2012/0025942 A1* | 2/2012 | Bhat et al. | 336/221 |
| 2012/0032521 A1* | 2/2012 | Inoue et al. | 307/104 |
| 2012/0032525 A1 | 2/2012 | Oyobe et al. | |
| 2012/0098348 A1* | 4/2012 | Inoue et al. | 307/104 |
| 2012/0161696 A1* | 6/2012 | Cook et al. | 320/108 |
| 2012/0175968 A1* | 7/2012 | Katsunaga et al. | 307/104 |
| 2012/0235509 A1* | 9/2012 | Ueno et al. | 307/104 |
| 2012/0326499 A1* | 12/2012 | Ichikawa et al. | 307/9.1 |
| 2013/0057207 A1* | 3/2013 | Ichikawa et al. | 320/108 |

FOREIGN PATENT DOCUMENTS

| | | | |
|---|---|---|---|
| JP | 4453741 B2 | 4/2010 | |
| JP | 2010-233442 A | 10/2010 | |
| JP | 2010-252446 A | 11/2010 | |
| JP | 2011147213 A * | 7/2011 | H02J 17/00 |

OTHER PUBLICATIONS

Noriyuki Nakajima et al., Fundamental Research About Parameter Design of Contactless Power Station (CLPS) for Moving Electric Loads, IEE Japan, Mar. 2008, 2-169, p. 193, English title only.

André Kurs et al., Wireless Power Transfer via Strongly Coupled Magnetic Resonances, Science, vol. 317 No. 5834, Jul. 6, 2007, pp. 83-86.

Masaki Kato et al., Wireless Power Transfer of Magnetic Resonant Coupling Using Self Resonance Frequency, IEEJ Industry Applications Society, 2010, 2-14, pp. II-289-II-292, English abstract.

\* cited by examiner

FIG.3
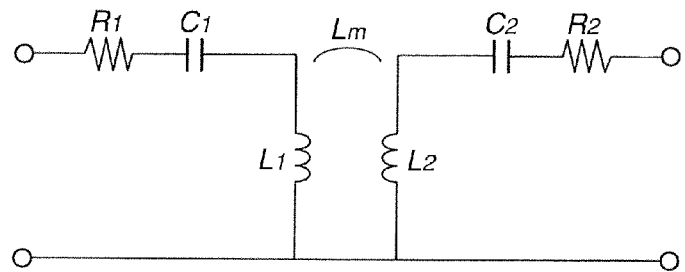
FIG.4
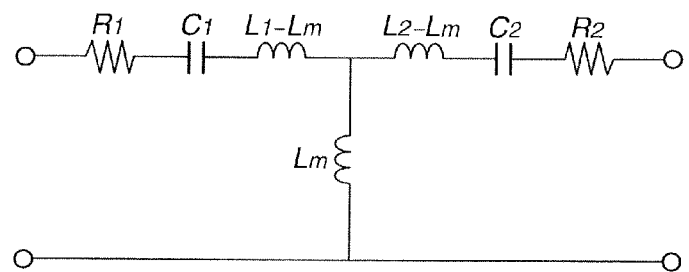
FIG.5
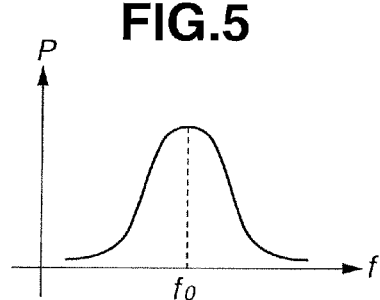
FIG.6(a)  FIG.6(b)
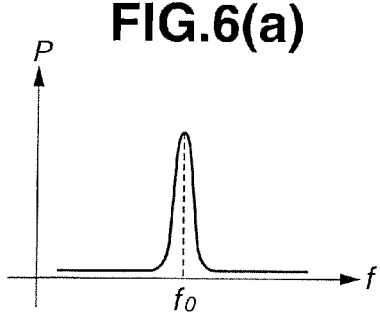 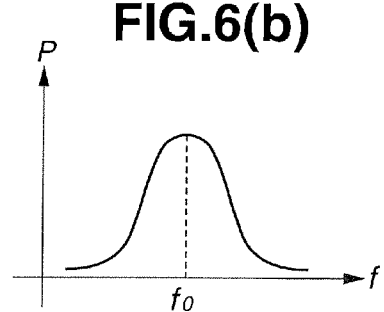

CONTACTLESS POWER FEEDING APPARATUS AND CONTACTLESS POWER FEEDING METHOD

TECHNICAL FIELD

The present invention relates to a technology for feeding, without physical contact, an electric power to a storage battery mounted on a moving body from an electric power source outside of the moving body.

BACKGROUND ART

In recent years, electrically powered vehicles, such as electric vehicles or the like have attracted a great deal of attention as a moving body that is environmentally friendly.

These electric vehicles have each an electric motor that generates a vehicle driving power and a rechargeable power storage battery that stores an electric power fed to the electric motor. However, the power storage batteries that are small in size and light in weight to be mounted in the electric vehicle are not large in storage capacity. Accordingly, users of the electric vehicles have to recharge the batteries at frequent intervals. Furthermore, for the recharging, the users have to handle a heavy charging cable, which is a troublesome work to the users.

One of methods of solution is a wireless power feeding that does not use an electric power source cable and a power feeding cable. A resonance method proposed by Non-Patent Document-1 mentioned below is able to effectively transfer an electric power for a remarkably long distance and thus the resonance method is collecting a lot of attention in recent years.

Furthermore, a wireless power feeding using self-resonant frequency via magnetic resonant coupling is described in Non-Patent Document-2 mentioned below, and power feeding apparatus of wireless type are described in Patent Documents-1, 2 and 3 mentioned below.

PRIOR ART DOCUMENTS

Patent Documents

Patent Document-1: Japanese Patent 4453741
Patent Document-2: Japanese Laid-open Patent Application (tokkai) 2010-233442.
Patent Document-3: Japanese Laid-open Patent Application (tokkai) 2010-252446.

Non-Patent Documents

Non-Patent Document-1: "Wireless Power Transfer via Strongly Coupled Magnetic Resonances" Jul. 6, 2007, SCIENCE, Volume-317, pages 83-86.
Non-Patent Document-2: Masaki KATO, Takehiro IMURA, Toshiyuki UCHIDA, Yoichi HORI, "Wireless Power Feeding using Self-Resonant Frequency via Magnetic Resonant Coupling", Heisei 22 (=2010 A.D.), IEEJ INDUSTRY APPLICATIONS SOCIETY.

SUMMARY OF INVENTION

Problems to be Solved by Invention

However, in the above-mentioned resonant method, an effective power transfer is obtained only when resonant frequencies of primary and secondary coils are properly adjusted. Thus, in this method, there is a need of control for adjusting the resonant frequencies.

In the method described in the above-mentioned Patent Document-1, detection of receiving electric power is made by the side of electric vehicle and a receiving condition of electric power is transmitted to the power transfer device via communications thereby to control the power transfer device. In this method, it is necessary to provide a communication device, and thus, both the electric vehicle and power transfer device are subjected to increase in cost. Furthermore, in this method, recharging of the battery is possible only when the electric vehicle and the power transfer device have a common communication system.

Furthermore, in the methods of the above-mentioned Patent Documents-2 and 3, the resonant frequency is detected by measuring impedance. In these proposed methods, the measuring of the impedance is carried out by scanning the frequency, and as a result, detecting of the resonant frequency is made through so-called scanning frequency intervals.

As will be understood from FIG. 5 that shows a relationship between a receiving electric power and a frequency of a high frequency supplying electric power, in case of the resonant method, the value of "Q" is high and the resonance is made within a very short frequency range, and thus, in order to derive a resonant frequency "f$\theta$" by using such method, it is necessary to use a very fine scanning frequency intervals and thus such method is not realistic. Furthermore, since the frequency detected is not the resonant frequency "f$\theta$", it is impossible to carry out the electric power transfer at the frequency of the highest efficiency.

The present invention is provided to solve the above-mentioned problems, and aims to provide a wireless power transfer device and/or method that is able to carry out a high efficiency electric power transfer without a wireless communication.

Means for Solving problems

In order to solve the above-mentioned problems, there is provided a contactless power feeding apparatus as defined in Claim 1 which includes a secondary coil magnetically coupled with a primary coil outside of a moving body with the work of resonance of a magnetic field and constructed to receive an electric power from the primary coil, a rectifier for rectifying the electric power received by the secondary coil, a rechargeable power storage battery for storing therein the electric power rectified by the rectifier, an electric motor mounted on the moving body for driving the moving body upon receiving the electric power from the rechargeable power storage battery, which is characterized in that the primary coil is magnetically coupled with the secondary coil with the work of resonance of a magnetic field and constructed to feed the secondary coil with a high frequency electric power; a high frequency electric power driver is provided for converting the electric power outside of the moving body to a high frequency electric power that can be supplied to the moving body upon resonance of the magnetic field, the converted electric power being supplied to the primary coil; a calculation means is provided for estimating, from supplying current and voltage of the high frequency electric power driver, equivalent circuit parameters of an electric power transfer from the primary coil to the secondary coil upon resonance of the magnetic field; and a control means is provided for estimating, from the equivalent circuit parameters estimated by the calculation means, a receiving electric power of the secondary coil and for controlling a frequency of the supplying electric power in a manner to cause the estimated receiving electric power to show the maximum value.

A contactless power feeding apparatus defined in Claim 2 is based on the apparatus of Claim 1, which is further characterized in that the control means estimates, from the equivalent circuit parameters estimated by the calculation means, the receiving electric power of the secondary coil which varies in accordance with the supplying electric power, and controls the frequency of the high frequency electric power driver in such a manner as to cause the estimated receiving electric power to show the maximum value.

A contactless power feeding apparatus defined in Claim 3 is based on the apparatus of Claim 1, which is further characterized in that the control means estimates, from the equivalent circuit parameters estimated by the calculation means, the receiving electric power of the secondary coil in accordance with at least one of the capacitance and inductance of the primary coil, and adjusts a resonant frequency of the primary coil by varying at least one of the capacitance and inductance of the primary coil in such a manner as to cause the estimated receiving electric power to show the maximum value.

A contactless power feeding method defined in Claim 4 is a method for feeding an electric power to a moving body in a transformation system, the system including a primary coil provided outside of the moving body, a secondary coil magnetically coupled with the primary coil with the work of resonance of a magnetic field and constructed to receive an electric power from the primary coil, a rectifier for rectifying the electric power received by the secondary coil, a rechargeable power storage battery for storing therein the electric power rectified by the rectifier, an electric motor mounted on the moving body for driving the moving body upon receiving the electric power from the rechargeable power storage battery, the method being characterized by having an electric power supplying step in which a high frequency electric power driver converts the electric power outside of the moving body to a high frequency electric power that can be supplied to the moving body upon resonance of the magnetic field, and feeds the converted high frequency electric power to the primary coil while varying a frequency of the converted high frequency electric power; an equivalent circuit parameter estimating step in which a calculation means estimates, from the supplying current and voltage of the high frequency electric power driver under operation of the electric power supplying step, equivalent circuit parameters of an electric power transfer between the primary and secondary coils upon resonance of the magnetic field; a receiving electric power estimating step in which a control means estimates, from the estimated equivalent circuit parameters, a receiving electric power of the secondary coil; and a controlling step in which the frequency of the supplying electric power is so controlled as to cause the estimated receiving electric power to show the maximum value.

A contactless power feeding method defined in Claim 5 is based on the method of Claim 4, which is further characterized in that the receiving electric power estimating step estimates, from the equivalent circuit parameters estimated by the equivalent circuit parameter estimating step, the receiving electric power of the secondary coil in accordance with the supplying electric power; and the controlling step controls the frequency of the high frequency electric power driver in such a manner as to cause the estimated receiving electric power to show the maximum value.

A contactless power feeding method defined in Claim 6 is based on the method of Claim 4, which is further characterized in that the receiving electric power estimating step estimates, from the equivalent circuit parameters estimated by the equivalent circuit parameter estimating step, the receiving electric power of the secondary coil in accordance with at least one of the capacitance and inductance of the primary coil; and the controlling step adjusts a resonant frequency of the primary coil by varying at least one of the capacitance and inductance of the primary coil in such a manner as to cause the estimated receiving electric power to show the maximum value.

In accordance with the above-mentioned construction and method, in a contactless power feeding to a moving body with the work of resonance of magnetic field, a power receiving part of the moving body can be made in the smallest size and thus cost can be reduced, and it is unnecessary for a moving body and a power feeding apparatus to have a same communication system, and the present invention can be easily applicable to any type of moving body. Furthermore, it is possible to carry out an electric power feeding from a power feeding apparatus to a moving body under the maximum receiving electric power without the work of a wireless communication, and thus, a high efficiency electric power transfer can be carried out.

Advantages of Invention (1) In accordance with the invention defined by Claim 1, 2 or 3, both detection of a receiving electric power by the side of a moving body such as an electric vehicle and transmission of the receiving condition of the electric power through a wireless communication are not necessary, both the electric vehicle and power transfer device can be made simple in construction and thus reduction in cost is achieved.

Furthermore, since the electric vehicle and power transfer device do not need usage of a common communication system which has been needed in the conventional one, the present invention can be easily applied to various types of electric vehicle (moving body).

Furthermore, wireless communication is not carried out, and thus a high efficiency electric power transfer can be obtained in which feeding of the electric power from the power transfer device to the moving body starts under a condition wherein the receiving electric power shows the maximum value.

(2) In accordance with the invention defined by Claim 4, 5 or 6, the wireless communication is not carried out and thus a high efficiency electric power transfer can be obtained in which a power supply starts at the time when the receiving electric power shows the maximum value.

BRIEF DESCRIPTION OF DRAWINGS

FIG. 3 is a view of an equivalent circuit for an electric power transfer through a resonance method.

FIG. 4 is a view of an equivalent circuit provided by altering the form of the equivalent circuit of FIG. 3.

FIG. 5 is a characteristic diagram showing a relationship between a frequency of a high frequency supplying electric power and a receiving electric power in case wherein an electric power transfer is carried out through a resonance method.

FIGS. 6(a) and 6(b) are characteristic diagrams showing a relationship between a frequency of a high frequency supplying electric power and a receiving electric power in case wherein the electric power transfer is carried out through the resonance method, in which FIG. 6(a) is a characteristic diagram with a coupling coefficient being small, and FIG. 6(b) is a characteristic diagram with the coupling coefficient being large.

EMBODIMENTS OF INVENTION

Although, in the following, embodiments of the present invention will be described with reference to the accompanying drawings, the present invention is not limited to such described embodiments. In the following embodiments-1 and 2, the invention is practically applied to a moving body, such as an electric vehicle of a type that can be fed with an electric power from an external power source without physical contact.

First Embodiment

Figure 1:
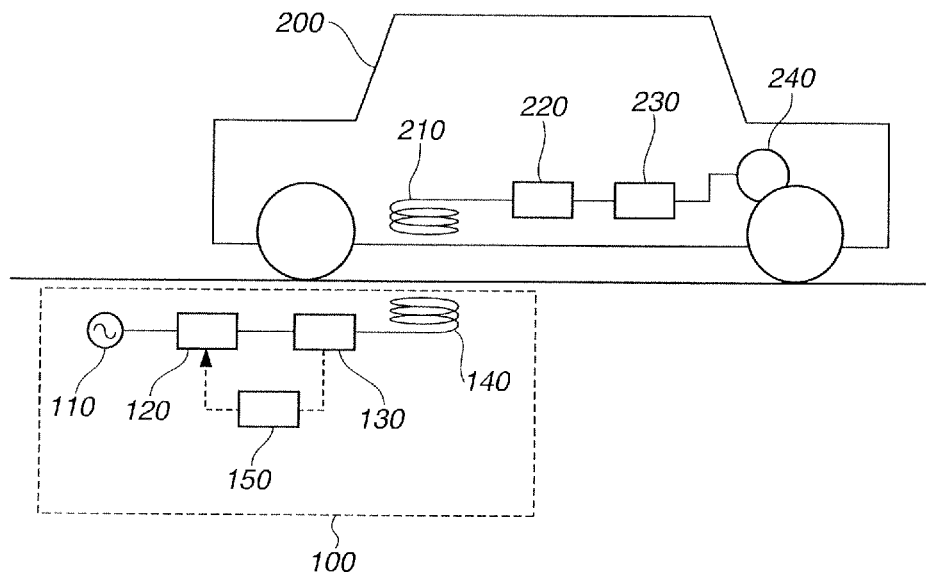
FIG. 1 is a block diagram of a first embodiment of the present invention.

FIG. 1 shows a block diagram of a first embodiment. In FIG. 1, denoted by numeral 100 is a power feeding apparatus that feeds, without physical contact, a moving body 200, for example an electric vehicle, with an electric power. The power feeding apparatus 100 comprises an alternating-current power supply 110 consisting of a system power supply, a high frequency power driver 120, a calculation device 130 as calculating means, a primary coil 140 arranged in a ground near a surface of the ground on which the moving body 200 is placed, and a control device 150 as controlling means.

On the moving body 200, there are mounted a secondary coil 210, a rectifier 220, a rechargeable power storage battery 230 and an electric motor 240 that drives the moving body 200 by using the electric power stored by the rechargeable power storage battery 230.

The high frequency power driver 120 of the power feeding apparatus 100 converts, by causing a magnetic field to resonate, the electric power from the alternating-current power supply 110 to a high frequency electric power that can transfer from the primary coil 140 to the secondary coil 210 of the moving body 200. That is, the converted high frequency electric power is supplied to the primary coil 140.

Due to resonance of the magnetic field, the primary coil 140 and the secondary coil 210 of the moving body 200 are magnetically coupled, and thus the electric power can transfer from the power feeding apparatus 100 to the moving body 200.

Based on the transfer current and voltage from the high frequency power driver 120, the calculation device 130 estimates equivalent circuit parameters for the electric power transfer from the primary coil 140 to the secondary coil 210 through the resonance method.

Based on the equivalent circuit parameters estimated by the calculation device 130, the control device 150 derives a relationship between a frequency of the supplying electric power of the primary coil 140 and an estimated value of the receiving electric power of the secondary coil 210. And, the frequency of the high frequency power driver 120 is so controlled as to cause the estimated receiving electric power to show the maximum value.

The secondary coil 210 is arranged in a body lower portion of the moving body 200 and functions to output the electric power received to the rectifier 220. The rectifier 220 rectifies the high frequency AC electric power received from the secondary coil 210 and outputs the rectified electric power to the rechargeable power storage battery 230.

When, in the device of FIG. 1, an electric power is fed to the primary coil 140 from the alternating-current power supply 110, the primary coil 140 and the secondary coil 210 of the moving body 200 become magnetically coupled due to resonance of the magnetic field, and thus, an electric power is fed from the primary coil 140 to the secondary coil 210. The electric power received by the secondary coil 210 is rectified by the rectifier 220 and stored by the rechargeable power storage battery 230.

Thus, in accordance with the power feeding apparatus 100 of the first embodiment, an electric power can be supplied to the moving body 200 without physical contact from the electric power source placed outside of the moving body, and the electric power can be stored in the rechargeable power storage battery 230.

During this electric power charging, by the calculation device 130, equivalent circuit parameters for the electric power transfer from the primary coil 140 of the power feeding apparatus 100 to the secondary coil 210 of the moving body 200 are estimated, and by the control device 150, the receiving electric power for the secondary coil 210 is estimated based on the estimated equivalent circuit parameters, and the frequency of the supplying electric power of the primary coil 140 is so controlled as to cause the estimated receiving electric power to show the maximum value. Accordingly, the electric power supply from the alternating-current power supply 110 placed outside of the moving body to the moving body 200 can be effectively made.

In the following, operation of the device constructed as mentioned hereinabove will be described in detail.

It is known that an electric power transfer through a resonance method can be represented by an equivalent circuit as shown in FIG. 3 wherein an inductance, a stray capacitance and an internal resistance of the primary coil 140 are shown by L1, C1 and R1 respectively, and an inductance, a stray capacitance and an internal resistance of the secondary coil 210 are shown by L2, C2 and R2 respectively (refer to Non-Patent Document-2 for example).

It is to be noted that Lm indicates a mutual inductance between the two coils. With introduction of a coupling coefficient k, Lm is represented in the following.

[Equation-1]

$$Lm = k\sqrt{(L1L2)} \tag{1}$$

When the equivalent circuit of FIG. 3 is deformed, there is provided an equivalent circuit shown in FIG. 4.

It is known that in case of the electric power transfer through resonance method, the frequency (viz., frequency "f" of the supplying high frequency electric power) of the high frequency electric power supplied to the primary coil 140 and the electric power (viz., receiving electric power "P") supplied to the secondary coil 210 have such a relationship as shown in FIG. 5. That is, the electric power supplied shows the maximum value at a resonance frequency "f0" of the two coils.

A relationship between the frequency "f" of the supplying high frequency electric power and the receiving electric power "P" supplied to the secondary coil 210 is depicted by FIGS. 6(a) and 6(b) in which FIG. 6(a) shows a case in which the coupling coefficient "k" is small and FIG. 6(b) shows a case in which the coupling coefficient "k" is large. It is known that when the coupling coefficient "k" becomes small, the spectrum space (or frequency width) that can send the maximum electric power becomes small (refer to Non-Patent Document-2).

The resonance frequency "f0" is varied in accordance with a variation of the capacitance and inductance of the primary coil. Furthermore, the coupling coefficient "k" is varied mainly by characteristics of respective cores of the primary and secondary coils a positional relation between the two coils.

In the power feeding apparatus 100 of the present invention, at first, by feeding a small electric power to the primary coil 140 to induce an electric power transfer from the primary coil 140 to the secondary coil 210, equivalent circuit parameters for the primary and secondary coils 140 and 210 (viz., inductance L1, stray capacitance C1, internal resistance R1, inductance L2, stray capacitance C2, internal resistance R2, mutual inductance Lm of the equivalent circuit shown in FIG. 4) are estimated, and then, a large electric power is fed to the primary coil 140 to induce an electric power transfer from the primary coil 140 to the secondary coil 210, and then, the rechargeable power storage battery 230 starts to store the electric power fed from the secondary coil 210.

That is, when, in FIG. 1, it is intended to start an electric power transfer with a moving body 200 kept stopped at a certain position, the electric power transfer is carried out with a small electric power from the primary coil 140 to the secondary coil 210 while varying, within a change permissible range, the frequency of the high frequency electric power outputted from the high frequency power driver 120.

Now, the inductance L1, stray capacitance C1 and internal resistance R1 of the equivalent circuit shown in FIG. 4 are parameters of the power feeding apparatus 100. These parameters are previously obtained by calculation of constants of the circuit, simulation and/or test runs of the moving body and those data are held for example by the calculation device 130.

In the calculation device 130, supplying current and voltage fed to the primary coil 140 at the time when the frequency changes are successively recorded together with the frequency, and all of the supplying current and supplying voltage is in a frequency change permissible range are recorded.

With the above-mentioned steps, the inductance L2, stray capacitance C2, internal resistance R2 and mutual inductance Lm of the equivalent circuit shown in FIG. 4 are estimated.

Then, the inductance L1, stray capacitance C1 and internal resistance R1 that are held by the calculation device and the inductance L2, stray capacitance C2, internal resistance R2 and mutual inductance Lm (viz., parameters of the equivalent circuit of FIG. 4) that are estimated by the calculation device are sent to the control device 150.

Figure 7:
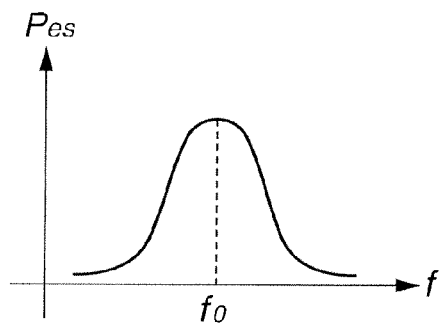
FIG. 7 is a characteristic diagram showing a relationship between a frequency of a high frequency supplying electric power and an estimated value of a receiving electric power in case of the first embodiment of the present invention.

In the control device 150, by processing the parameters of the equivalent circuit that have been sent thereto, a receiving electric power fed to the secondary coil 210 in accordance with the frequency is estimated, and a relationship between the frequency "f" of the high frequency supplying electric power and the estimated value "Pes" of the receiving electric power, such as one as shown in FIG. 7, is obtained.

Thereafter, in order to cause the high frequency power driver 120 to output a frequency that brings about the maximum of the estimated value "Pes" of the receiving electric power, that is, the high frequency electric power of the resonant frequency "f0", the high frequency power driver 120 is controlled and then charging is started. With this step, feeding of the electric power to the secondary coil 210 becomes possible under a condition wherein without the aid of a wireless communication the receiving electric power shows the maximum value, and thus, a high efficiency electric power transfer is possible.

Second Embodiment

Figure 2:
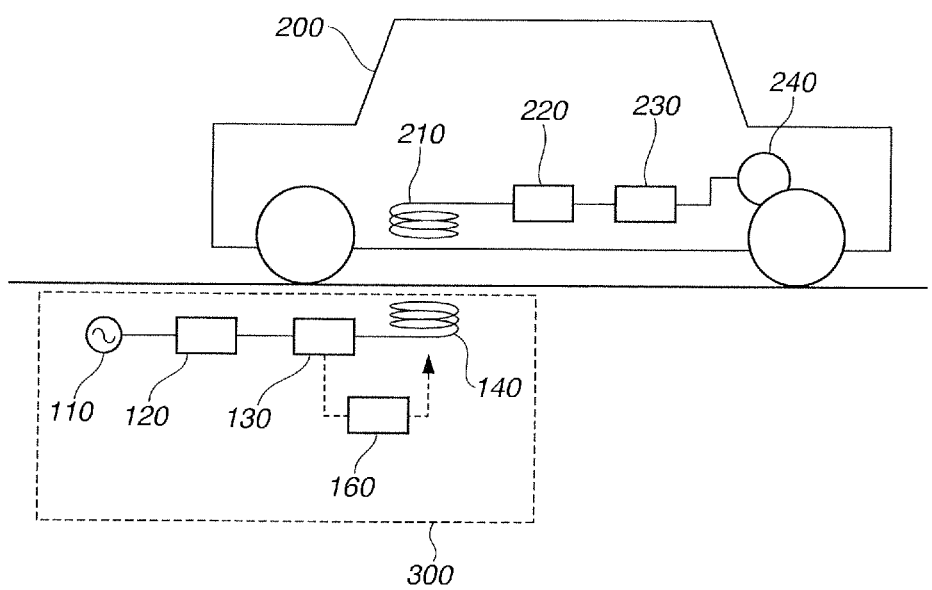
FIG. 2 is a block diagram of a second embodiment of the present invention.

FIG. 2 shows a block diagram of a second embodiment, in which same elements or portions as those in FIG. 1 are denoted by the same numerals. A moving body 200 in the is second embodiment has the same construction as the moving body 200 of the first embodiment.

Denoted by numeral 300 is a power feeding apparatus of the second embodiment. Differences from the power feeding apparatus 100 of FIG. 1 are as follows. That is, in place of the control device 150 that controls the high frequency power driver 120 in accordance with the equivalent circuit parameters estimated by the calculation device 130, there is employed an adjusting device 160 that has such functions as to change the capacitance and inductance of the primary coil 140, estimate the receiving electric power of the secondary coil 210 that varies in accordance with at least one of the capacitance and inductance of the primary coil 140, and adjust the resonant frequency of the primary coil 140 by changing at least one of the capacitance and inductance of the primary coil 140 in a manner as to cause the estimated receiving electric power to show the maximum value. Others are the same as those of FIG. 1.

Also in this second embodiment, like in the first embodiment, at first, by feeding a small electric power to the primary coil 140 to induce an electric power transfer from the primary coil 140 to the secondary coil 210, equivalent circuit parameters for the primary and secondary coils 140 and 210 (viz., inductance L1, stray capacitance C1, internal resistance R1, inductance L2, stray capacitance C2, internal resistance R2, mutual inductance Lm of the equivalent circuit shown in FIG. 4) are estimated, and then, a large electric power is fed to the primary coil 140 to induce an electric power transfer from the primary coil 140 to the secondary coil 210, and then, the rechargeable power storage battery 230 starts to store the electric power fed from the secondary coil 210.

That is, when, in FIG. 2, it is intended to start an electric power transfer with a moving body 200 kept stopped at a certain position, the electric power transfer is carried out by the adjusting device 160 with a small electric power from the primary coil 140 to the secondary coil 210 while varying, within a change permissible range, at least one of the capacitance (C1) and inductance (L1) of the primary coil 140.

Now, the inductance L1, stray capacitance C1 and internal resistance R1 of the equivalent circuit shown in FIG. 4 are parameters of the power feeding apparatus 100. These parameters are previously obtained by calculation of constants of the circuit, simulation and/or test runs of the moving body and those data are held for example by the calculation device 130.

In the calculation device 130, supplying current and voltage fed to the primary coil 140 at the time when at least one of the capacitance and inductance changes are successively recorded together with the capacitance and inductance, and all of the supplying current and supplying voltage in a change permissible range are recorded.

With the above-mentioned steps, the inductance L2, stray capacitance C2, internal resistance R2 and mutual inductance Lm of the equivalent circuit shown in FIG. 4 are estimated.

Then, the inductance L1, stray capacitance C1 and internal resistance R1 that are held by the calculation device and the inductance L2, stray capacitance C2, internal resistance R2 and mutual inductance Lm (viz., parameters of the equivalent circuit of FIG. 4) that are estimated by the calculation device are sent to the adjusting device 160.

Figure 8:
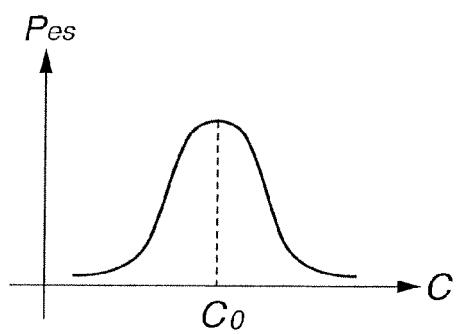
FIG. 8 is a characteristic diagram showing a relationship between a capacitance of a primary coil and the estimated value of the receiving electric power in case of the second embodiment of the present invention.
Figure 9:
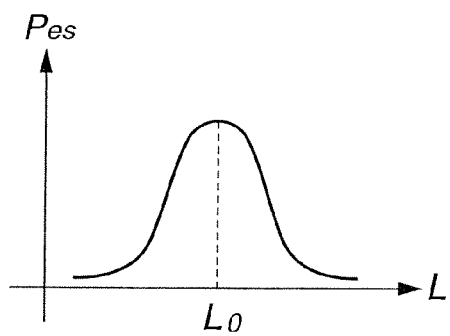
FIG. 9 is a characteristic diagram showing a relationship between an inductance of the primary coil and the estimated value of the receiving electric power in case of the second embodiment of the present invention.

In the adjusting device 160, by processing the parameters of the equivalent circuit that have been sent thereto, a receiving electric power fed to the secondary coil 210 in accordance with the frequency is estimated, and a relationship between the capacitance of the primary coil and the estimated value "Pes" of the receiving electric power, such as one as shown in FIG. 8 and/or a relationship between the inductance "L" of the primary coil and the estimated value "Pes" of the receiving electric power, such as one as shown in FIG. 9 is obtained.

Thereafter, the capacitance C0 or Inductance L0 of the primary coil 140 is changed to cause the estimated value "Pes" to show the maximum, and charging to the rechargeable power storage battery 230 is started. With these steps, feeding of the electric power from the alternating-current power supply 110 to the secondary coil 210 becomes possible under a condition wherein without the aid of a wireless communication the receiving electric power shows the maximum value, and thus, a high efficiency electric power transfer is possible.

The application of the present invention is not limited to the electric vehicle. That is, the present invention is applicable to other moving bodies as long as the bodies can receive electric power without physical contact.

Furthermore, the power supply outside of the moving body is not limited to the AC power supply. That is, the invention may be used in an environment in which an electric power from a direct-current power supply is converted to a high frequency electric power.

EXPLANATION ON REFERENCE NUMERALS 100, 300 . . . power feeding apparatus
110 . . . alternating-current power supply
120 . . . high frequency power driver
130 . . . calculation device
140 . . . primary coil
150 . . . control device
160 . . . adjusting device
200 . . . moving body
210 . . . secondary coil
220 . . . rectifier
230 . . . rechargeable power storage battery
240 . . . electric motor

The invention claimed is:

1. A contactless power feeding apparatus including a secondary coil magnetically coupled with a primary coil outside of a moving body with the work of resonance of a magnetic field and constructed to receive an electric power from the primary coil, a rectifier for rectifying the electric power received by the secondary coil, a rechargeable power storage battery for storing therein the electric power rectified by the rectifier, an electric motor mounted on the moving body for driving the moving body upon receiving the electric power from the rechargeable power storage battery,
which is characterized in that:
the primary coil is magnetically coupled with the secondary coil with the work of resonance of a magnetic field and constructed to feed the secondary coil with a high frequency electric power;
a high frequency electric power driver is provided for converting the electric power outside of the moving body to a high frequency electric power that can be supplied to the moving body upon resonance of the magnetic field, the converted electric power being supplied to the primary coil;
a calculation means is provided for estimating, from supplying current and voltage of the high frequency electric power driver, equivalent circuit parameters of an electric power transfer from the primary coil to the secondary coil upon resonance of the magnetic field; and
a control means is provided for estimating, from the equivalent circuit parameters estimated by the calculation means, a receiving electric power of the secondary coil and for controlling a frequency of the supplying electric power in a manner to cause the estimated receiving electric power to show the maximum value.

2. A contactless power feeding apparatus as claimed in claim 1, which is further characterized in that the control means estimates, from the equivalent circuit parameters estimated by the calculation means, the receiving electric power of the secondary coil which varies in accordance with the supplying electric power, and controls the frequency of the high frequency electric power driver in such a manner as to cause the estimated receiving electric power to show the maximum value.

3. A contactless power feeding apparatus as claimed in claim 1, which is further characterized in that the control means estimates, from the equivalent circuit parameters estimated by the calculation means, the receiving electric power of the secondary coil in accordance with at least one of the capacitance and inductance of the primary coil, and adjusts a resonant frequency of the primary coil by varying at least one of the capacitance and inductance of the primary coil in such a manner as to cause the estimated receiving electric power to show the maximum value.

4. A contactless power feeding method for feeding an electric power to a moving body in a transportation system, the system including a primary coil provided outside of the moving body, a secondary coil magnetically coupled with the primary coil with the work of resonance of a magnetic field and constructed to receive an electric power from the primary coil, a rectifier for rectifying the electric power received by the secondary coil, a rechargeable power storage battery for storing therein the electric power rectified by the rectifier, an electric motor mounted on the moving body for driving the moving body upon receiving the electric power from the rechargeable power storage battery,
the method being characterized by having:
an electric power supplying step in which a high frequency electric power driver converts the electric power outside of the moving body to a high frequency electric power that can be supplied to the moving body upon resonance of the magnetic field, and feeds the converted high frequency electric power to the primary coil while varying a frequency of the converted high frequency electric power;
an equivalent circuit parameter estimating step in which a calculation means estimates, from the supplying current and voltage of the high frequency electric power driver under operation of the electric power supplying step, equivalent circuit parameters of an electric power transfer between the primary and secondary coils upon resonance of the magnetic field;
a receiving electric power estimating step in which a control means estimates, from the estimated equivalent circuit parameters, a receiving electric power of the secondary coil; and a controlling step in which the frequency of the supplying electric power is so controlled as to cause the estimated receiving electric power to show the maximum value.

5. A contactless power feeding method as claimed in claim 4, which is further characterized in that:
the receiving electric power estimating step estimates, from the equivalent circuit parameters estimated by the equivalent circuit parameter estimating step, the receiving electric power of the secondary coil in accordance with the supplying electric power; and
the controlling step controls the frequency of the high frequency electric power driver in such a manner as to cause the estimated receiving electric power to show the maximum value.

6. A contactless power feeding method as claimed in claim 4, which is further characterized in that:
the receiving electric power estimating step estimates, from the equivalent circuit parameters estimated by the equivalent circuit parameter estimating step, the receiving electric power of the secondary coil in accordance with at least one of the capacitance and inductance of the primary coil; and
the controlling step adjusts a resonant frequency of the primary coil by varying at least one of the capacitance and inductance of the primary coil in such a manner as to cause the estimated receiving electric power to show the maximum value.

* * * * *